(12) United States Patent
Riazi

(10) Patent No.: US 7,850,302 B1
(45) Date of Patent: *Dec. 14, 2010

(54) EYEGLASS HOLDER WITH CLASP

(76) Inventor: Shirin Riazi, P.O. Box 4777, West Hills, CA (US) 91308

( * ) Notice: Subject to any disclaimer, the term of this patent is extended or adjusted under 35 U.S.C. 154(b) by 0 days.

This patent is subject to a terminal disclaimer.

(21) Appl. No.: 12/454,785

(22) Filed: May 22, 2009

Related U.S. Application Data

(63) Continuation-in-part of application No. 11/323,419, filed on Dec. 31, 2005, now Pat. No. 7,553,018.

(51) Int. Cl.
*G02C 1/00* (2006.01)
*A45F 5/02* (2006.01)

(52) U.S. Cl. .......................... 351/158; 24/3.3
(58) Field of Classification Search ............... 351/41, 351/158; 24/3.3, 3.11, 3.12, 10 R, 338, 332, 24/66.1, 114.6, 303, 3.8
See application file for complete search history.

(56) References Cited

U.S. PATENT DOCUMENTS

| | | | | |
|---|---|---|---|---|
| 5,860,191 A * | 1/1999 | Sieger | ........................... | 24/3.3 |
| 5,941,487 A * | 8/1999 | Keely | ................... | 248/231.51 |
| 5,956,812 A * | 9/1999 | Moennig | ....................... | 24/3.3 |
| 6,598,268 B1 * | 7/2003 | Zelman | ........................ | 24/3.3 |
| 7,553,018 B1 * | 6/2009 | Riazi | ........................... | 351/158 |

* cited by examiner

*Primary Examiner*—Hung X Dang

(57) ABSTRACT

This invention is an eyeglass holder attachable to clothing, office and shop equipment, handbags, luggage, vehicles and personal transportation. Cooperating clip arms of three designs—straight, rounded and comb shape—close on or around the desired attach object. A closing clasp at the end of the clip provides additional fastening for holding the clip in position around an object such as a strap or belt.

17 Claims, 19 Drawing Sheets

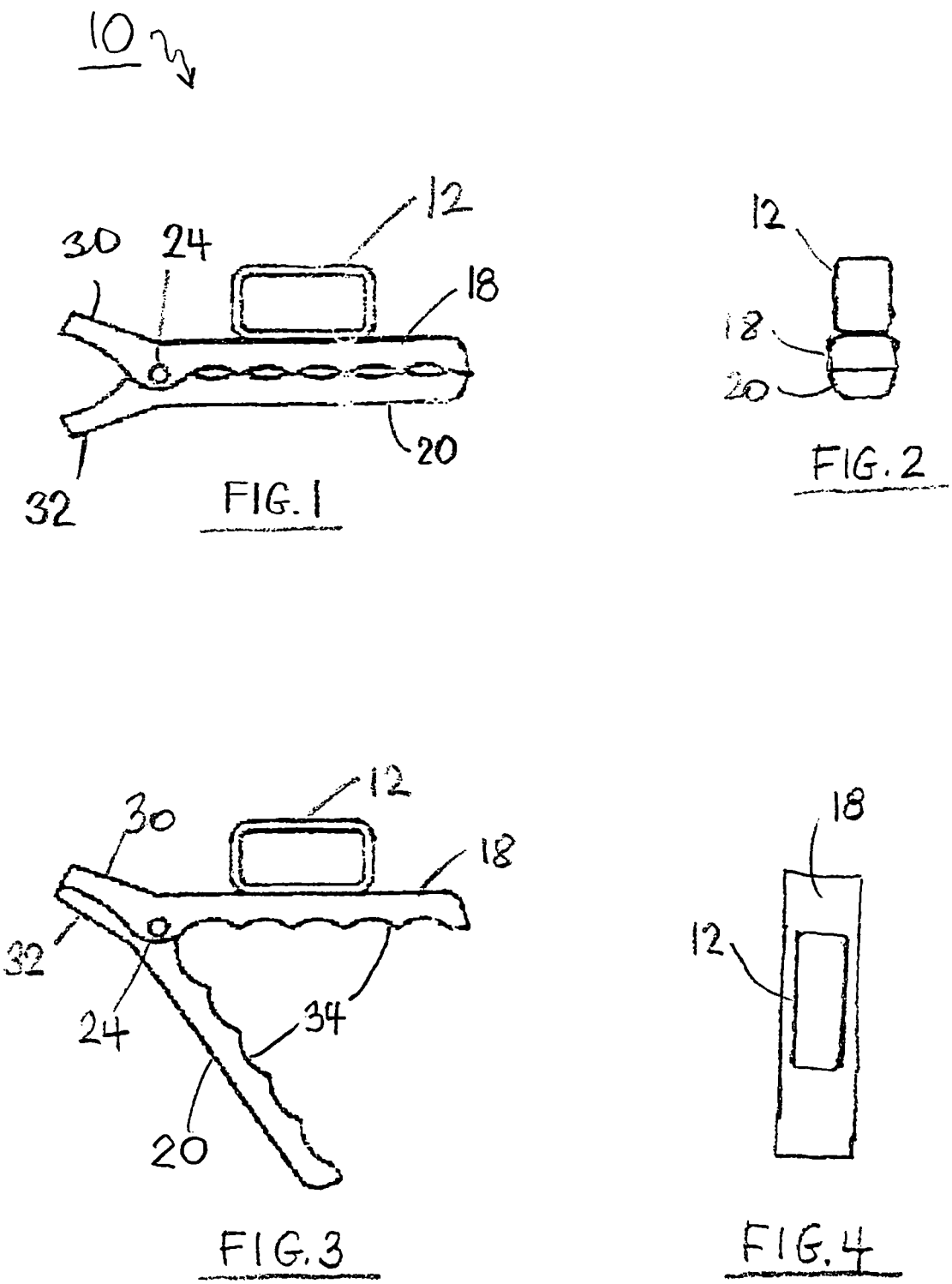

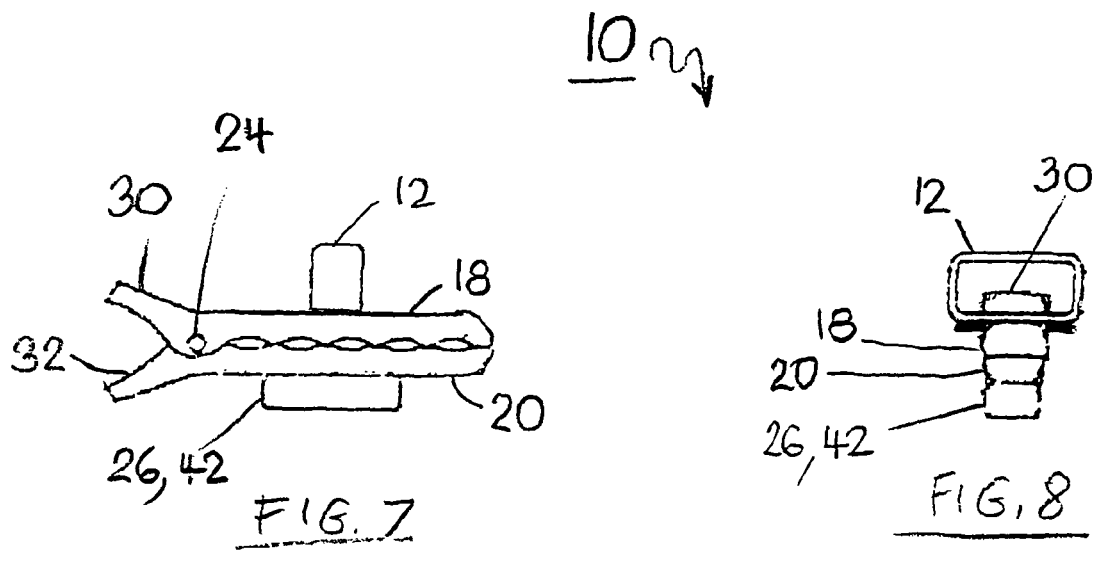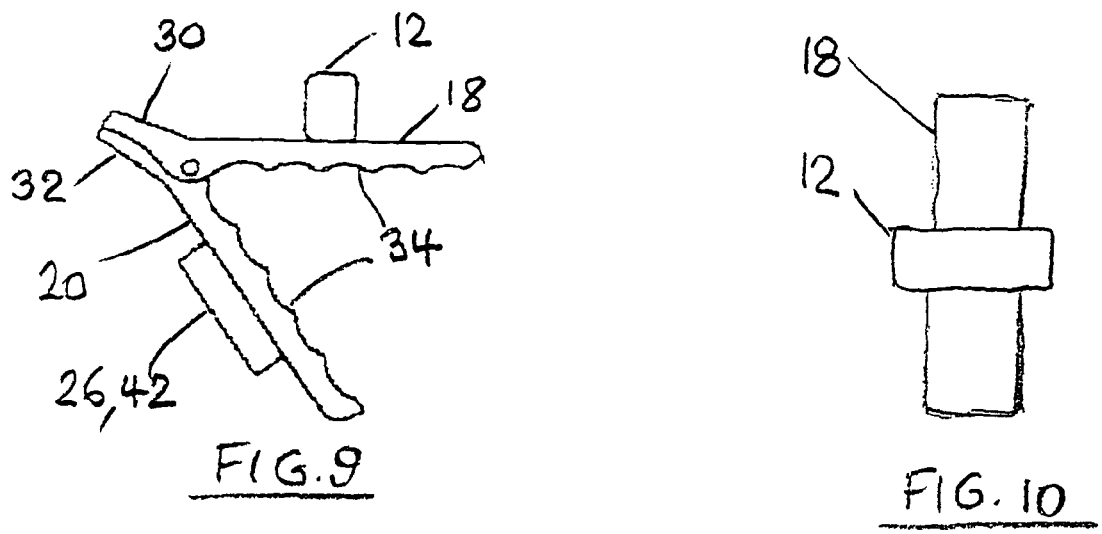

Figures 5, 6:
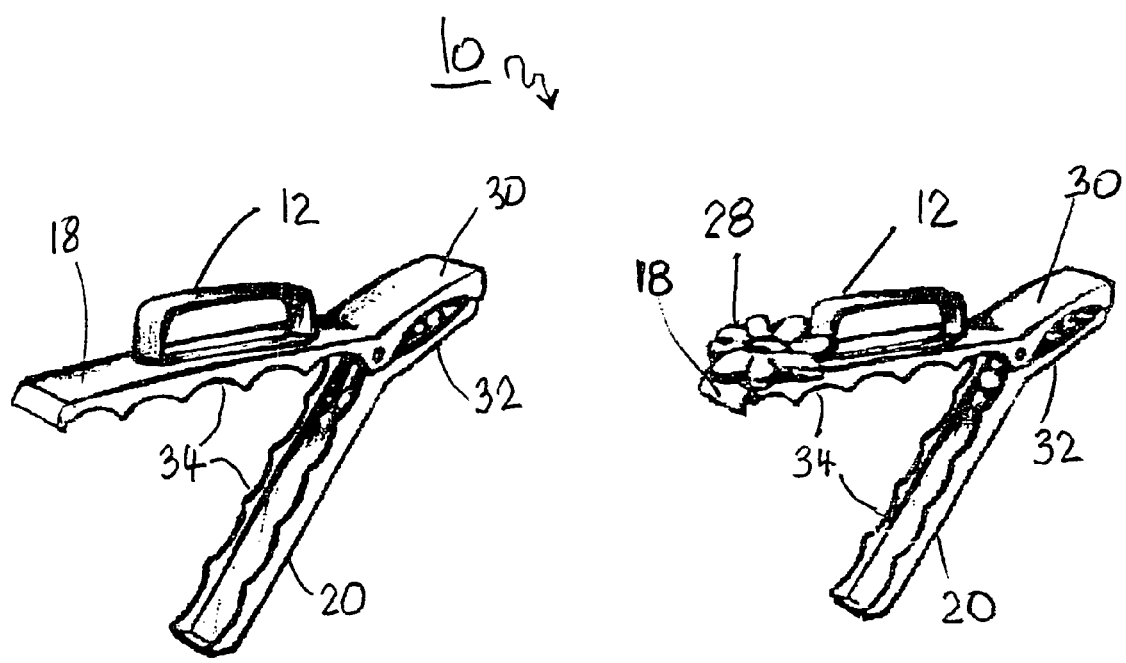

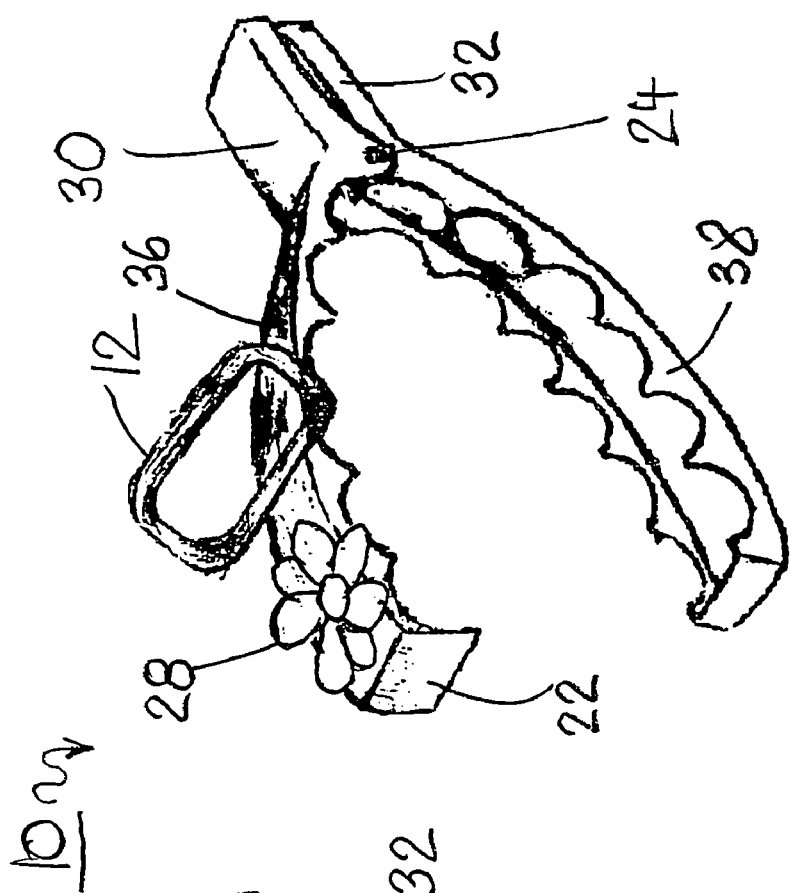
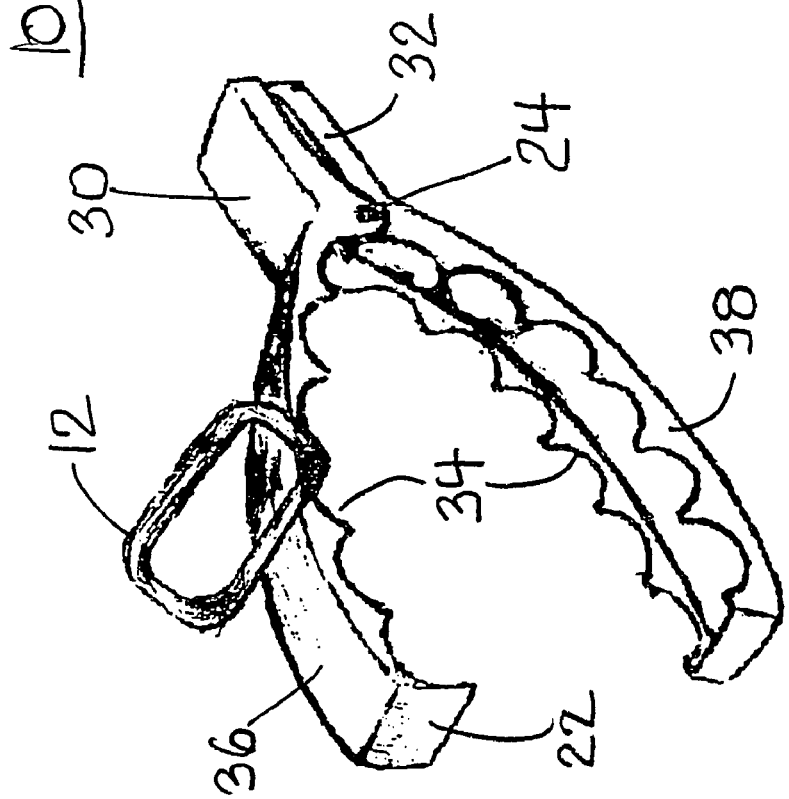

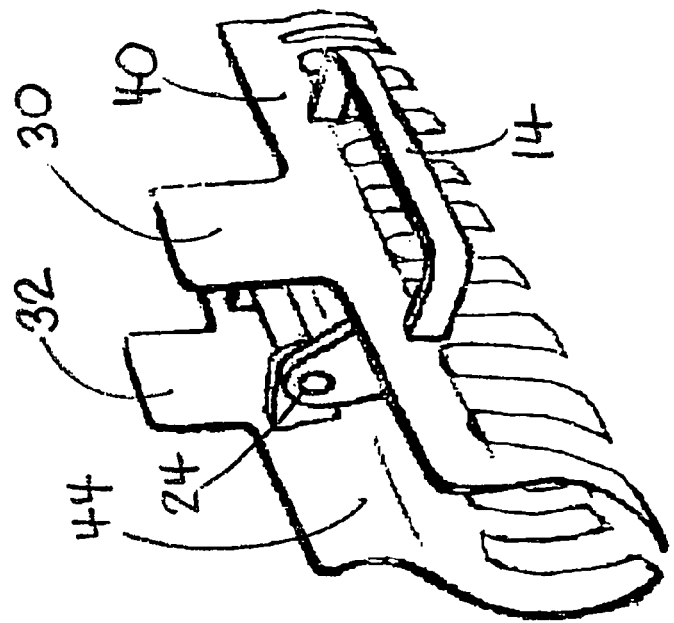
FIG. 41
FIG. 42
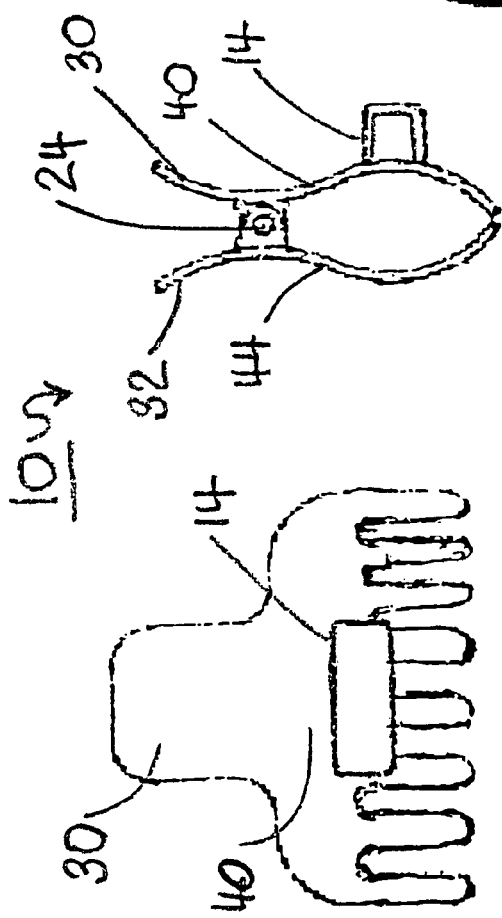
FIG. 43
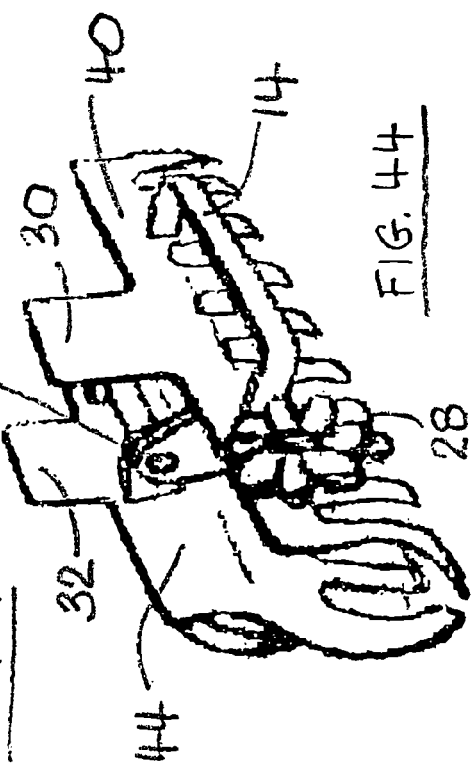
FIG. 44

EYEGLASS HOLDER WITH CLASP

CROSS-REFERENCE TO RELATED APPLICATIONS

This application is a continuation in part of U.S. patent application Ser. No. 11/323,419 filed on Dec. 31, 2005, now U.S. Pat. No. 7,553,018 and claims the benefit of Disclosure Document No. 55144 filed Jun. 9, 2004.

BACKGROUND OF INVENTION

1. Field of Invention

This invention relates generally to holders for eyeglasses. It particularly relates to eyeglass holders attachable to garments, purses, briefcases, luggage and personal transportation.

2. Discussion of Related Art

A patent search was undertaken in which the following patents were found:

U.S. Pat. No. 4,732,465 to Field (1988)
U.S. Pat. No. 5,229,796 to Nitta (1993)
U.S. Pat. No. 5,278,591 to Trotter (1994)
U.S. Pat. No. 5,956,812 to Moennig (1999)
U.S. Pat. No. 6,273,375 to Knepp et al (2001)
U.S. Pat. No. 6,343,859 to McCormick (2002)

These patents describe: devices attached to a temple piece ('859, '465); a loop and alligator clip holder ('812); remote mounting by a tether line ('591); a second structural set of eyeglasses as protection for the correcting eyeglasses ('796); and a spectacles mounting and display card ('375).

The eyeglass holder according to '812 is made of flexible cord which could be damaged or broken if subjected to an impulsive load. The present invention was geared toward a solid and also attractive eyeglass holder capable of resisting such loads.

SUMMARY OF THE INVENTION

The eyeglass holder of this invention comprises upper and lower clip arms joined by a spring hinge and is attachable to clothing, office and shop equipment, handbags, briefcases, vehicles and personal transportation such as bicycles, walkers and wheelchairs.

Normally, the spring hinge keeps the clip arms closed. When the clip arms are to be attached to an object, the user spreads the clip arms by pressing together an upper and a lower lever to open the clip arms against the spring force.

A loop made of solid material is firmly attached to the upper clip arm for suspending a pair of eyeglasses by a temple piece. The invention comes with three clip arm designs:

Straight with interior gripping surfaces—for attaching to flat fabrics, leather and plastics;

Rounded with a closing clasp—for attaching to thicker objects like straps on handbags and backpacks; and Comb shape with interlocking teeth for attaching completely around cylindrical objects like handbag and luggage handles and bars on bicycles, walkers and wheelchairs and other personal transportation means.

Further, a magnet with a flat outer surface can be secured to the outer surface of any lower clip arm for attaching to a flat ferrous metallic surface. The magnet is replaced by an adhesive strip for attaching to a flat nonmetallic surface.

In all cases the solid and rigid loop can be located parallel to or perpendicular to the clips. With the straight and rounded clips, the loop can also be located at 45 degrees to the clips. With straight and rounded clip arms the loop is closed or four-sided. It can accommodate a movable slider partition to grip the temple piece. For the comb shape the loop is open or 3-sided and cannot include a slider.

In addition, a metallic or plastic ornament can be placed at the end of an upper arm clip; typically a logo, birthstone, flower, sports symbol, or miniature car, boat, or plane. The components of the eyeglass holder can be made of metal or plastic of any desired color. The designs of the invention permit the eyeglass holder to be attached to a variety of objects in an optimal way. The advantages include portability, ease of use and an attractive appearance.

BRIEF DESCRIPTION OF THE SEVERAL VIEWS OF THE DRAWING AND DETAILED DESCRIPTION OF THE INVENTION

Figure 54:
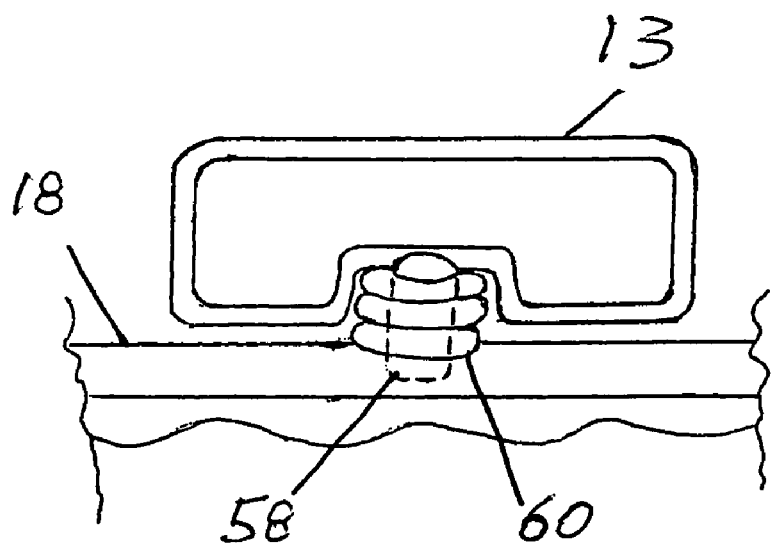

A better understanding of the invention may be gained by Reference to the Detailed Description which follows, in conjunction with FIGS. 1 through 54 which show the various designs and components of the invention and an application. In the drawings the straight clip arm design is depicted in FIGS. 1-20, the rounded clip arm design in FIGS. 21-40, and the comb shape design in FIGS. 41-50. In all Figures the assembled invention is denoted by numeral 10.

FIGS. 1-6 show the straight design with closed loop 12 parallel to the clip. FIG. 1 is a side view with upper clip arm 18 and lower clip arm 20 closed. Top lever 30 and bottom lever 32 with clip arms 18 and 20 open by closing top and bottom levers 30 and 32. Gripping surfaces 34 are shown on the inside of clip arms 18 and 20. Other components are as in FIG. 1. Now FIG. 4 is a top view, looking down on upper clip arm 18 and parallel closed loop 12. FIG. 5 is a pictorial view with clip arms open, corresponding to FIG. 3. Now FIG. 6 is identical with FIG. 5, except that ornament 28 has been added at the tip of upper clip arm 18.

Figures 11, 12:
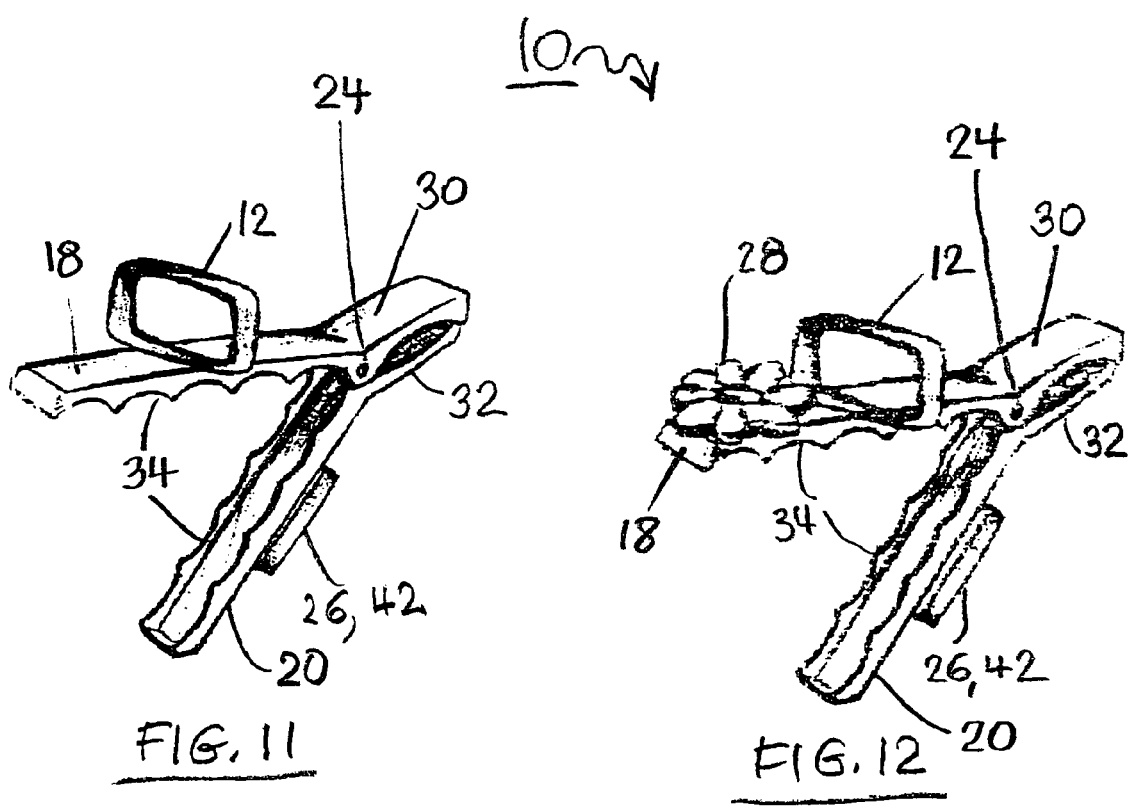

FIGS. 7-12 show the straight design with a magnet 26 or adhesive strip 42 attached to lower clip arm 20; and with closed loop 12 perpendicular to the clip arms, centered on upper clip arm 18. FIG. 7 is a side view with the clip arms closed, and FIG. 8 is the corresponding end view. FIG. 9 is a side view with the clip arms open, showing gripping surfaces 34. FIG. 10 is a top view showing upper clip arm 18 and perpendicular closed loop 12. FIG. 11 is a pictorial view corresponding to FIG. 9 and FIG. 12 is like FIG. 11 except that ornament 28 has been added at the tip of upper clip arm 18.

Figure 13:
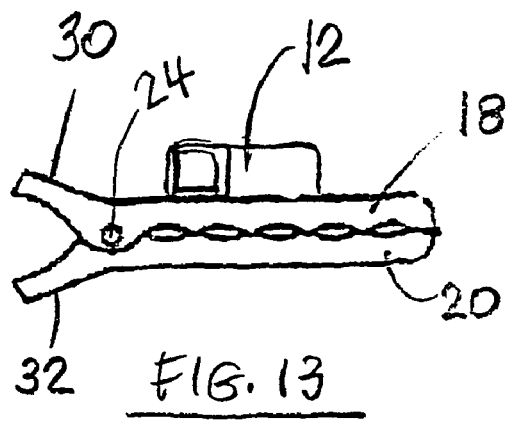
Figure 14:
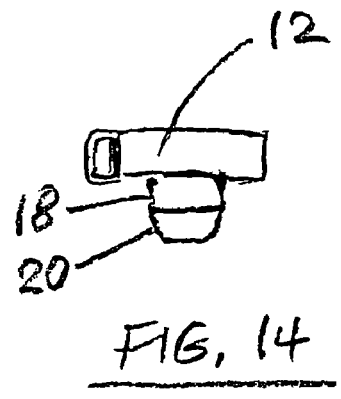
Figure 15:
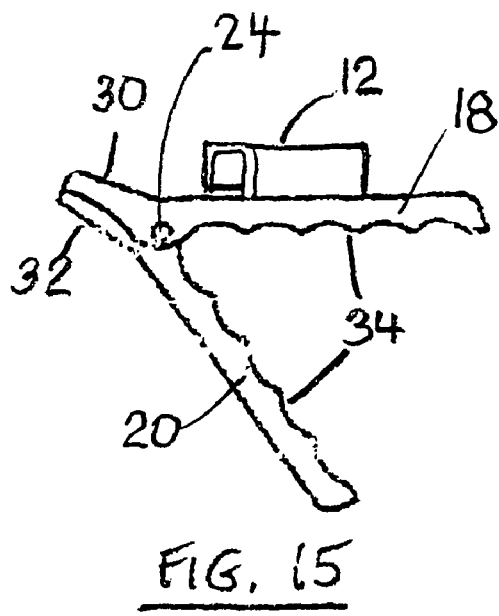
Figure 16:
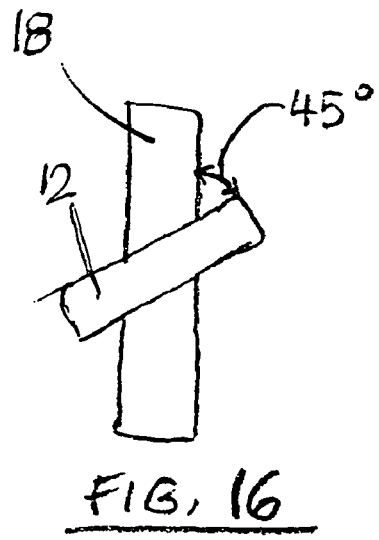
Figures 17, 18:
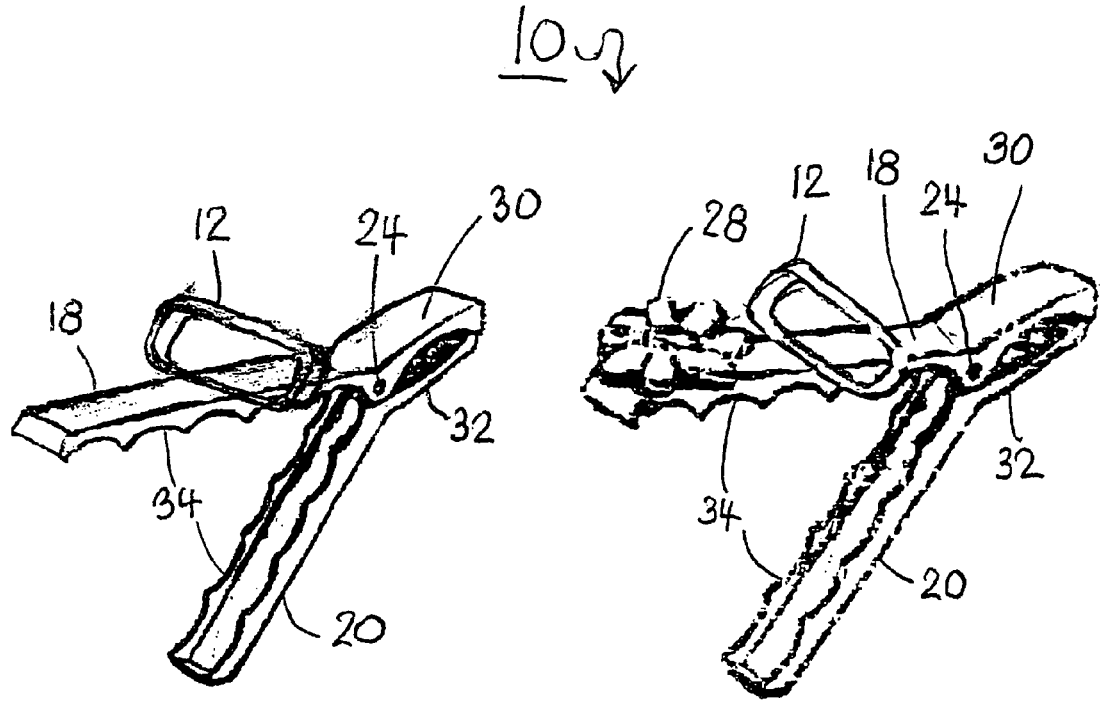

FIGS. 13-18 show closed loop 12 at 45 degrees to clip arms 18 and 20. FIG. 13 is a side view with closed clip arms 18 and 20. FIG. 14 is an end view corresponding to FIG. 13. Now FIG. 15 is a side view with open clip arms 18 and 20. FIG. 16 is a top view showing closed loop 12 at 45 degrees to upper clip arm 18. FIG. 17 is a pictorial view corresponding to side view FIG. 15, and FIG. 18 is like FIG. 17 but with ornament 28 added.

Figure 19:
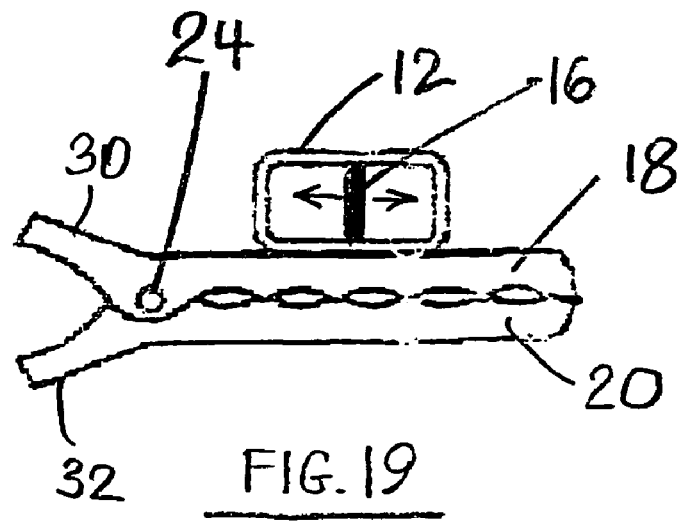
Figure 20:
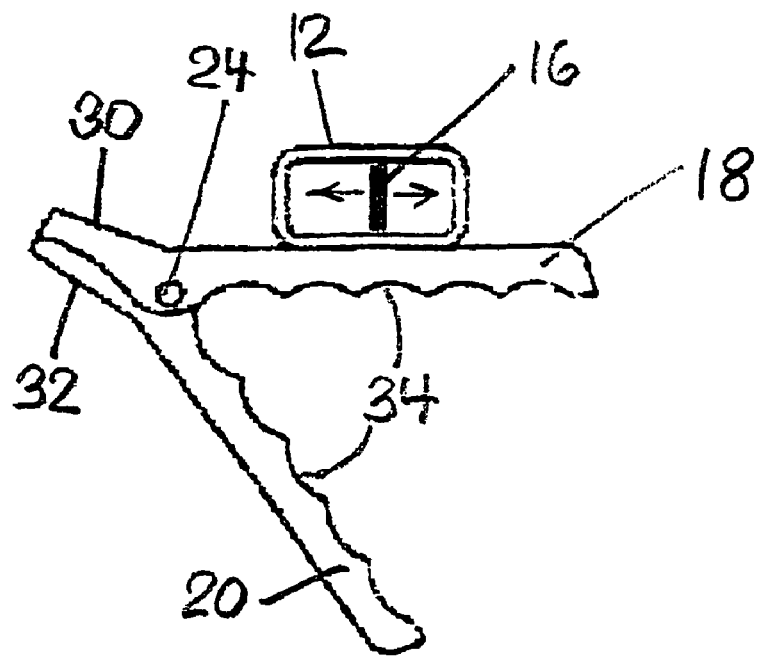

A movable slider partition 16 inside closed loop 12 is shown in FIG. 19 which is otherwise the same as FIG. 1, and in FIG. 20 which is otherwise the same as FIG. 3.

FIGS. 21-26 show the upper rounded clip arm 36 with closing clasp 22, and lower rounded clip arm 38, with parallel loop 12 and magnet 26.

Figure 21:
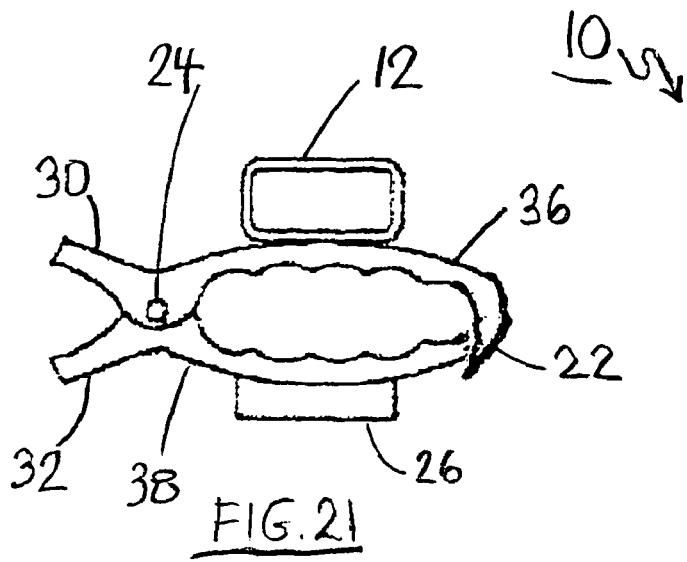
Figure 22:
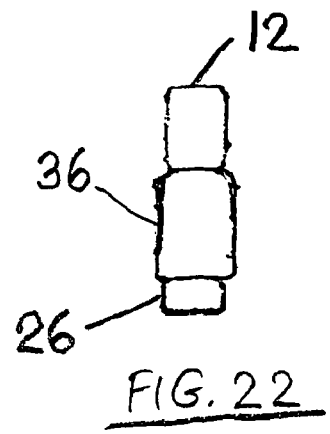
Figure 23:
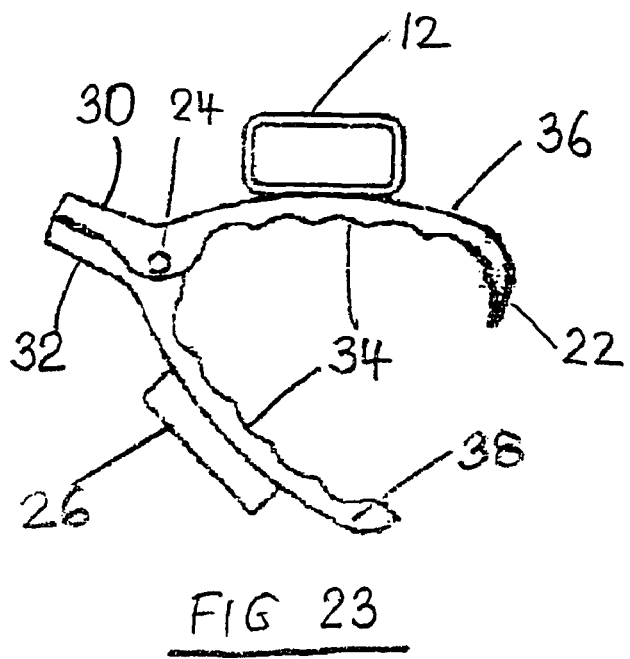
Figure 24:
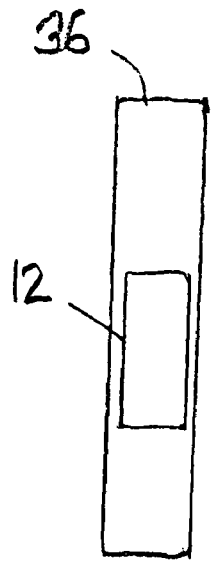
Figure 25:
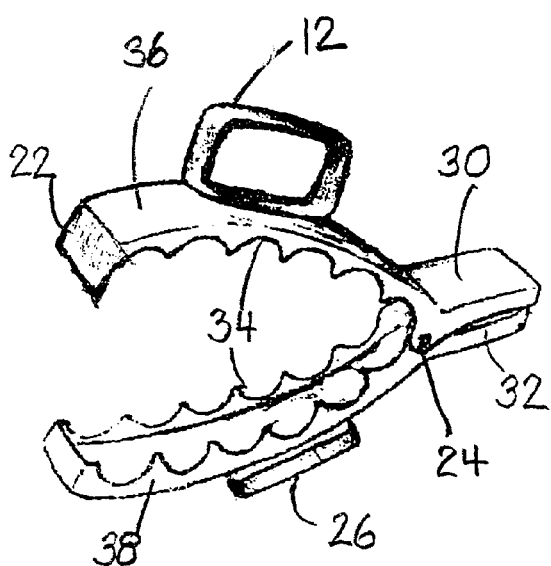
Figure 26:
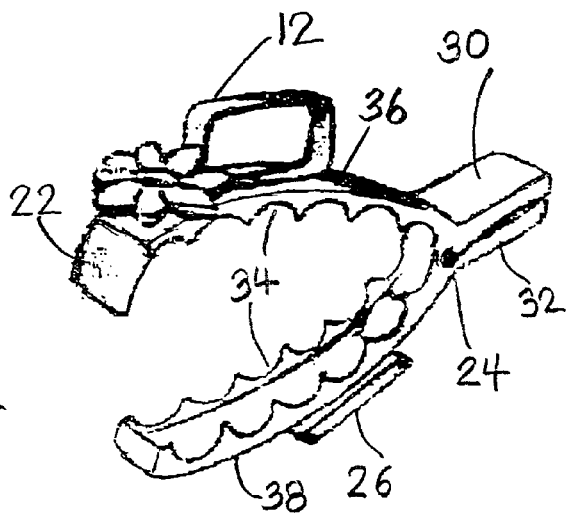

FIG. 21 is a side view with the clip arms closed, also showing spring hinge 24 and top and bottom levers 30 and 32. FIG. 22 is an end view corresponding to FIG. 21. Now FIG. 23 is a side view showing levers 30 and 32 compressed to open rounded clip arms 36 and 38, with internal gripping surfaces 34. FIG. 24 is a top view showing parallel closed loop 12 and upper rounded clip arm 36. FIG. 25 is a pictorial view corresponding to the side view of FIG. 23, and FIG. 26 is like FIG. 25, with added ornament 28.

Figure 27:
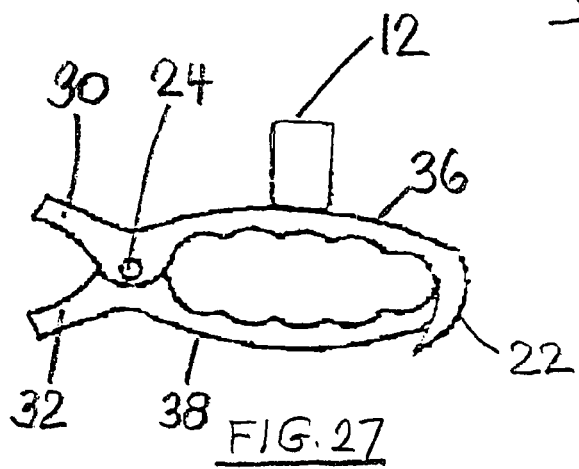
Figure 28:
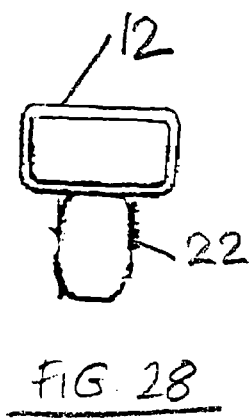
Figure 29:
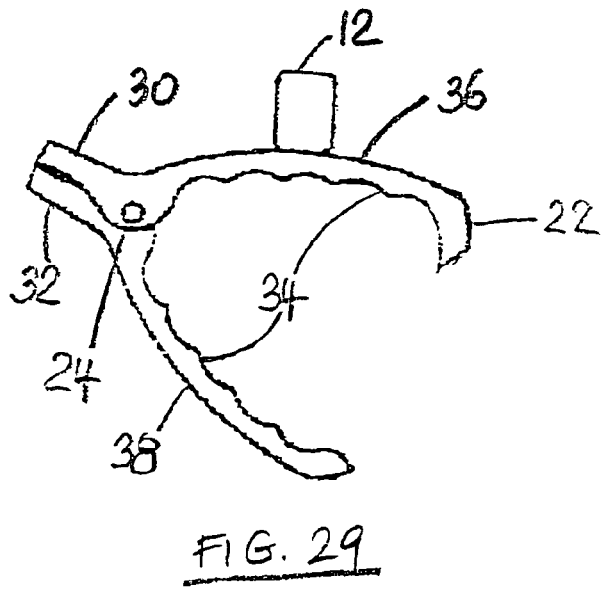
Figure 30:
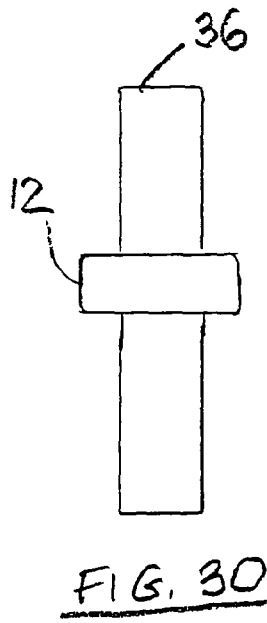
Figure 31:
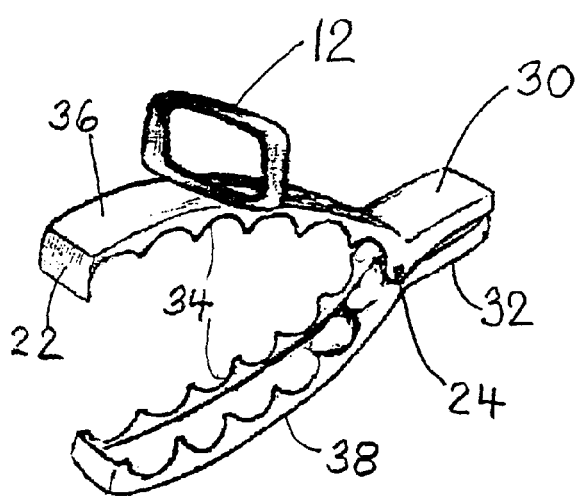
Figure 32:
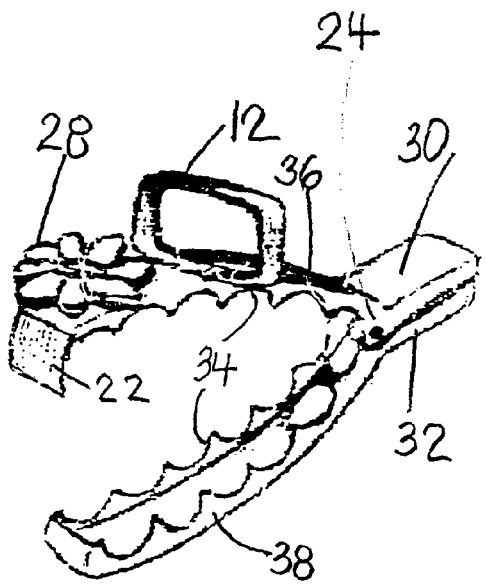

FIGS. 27-32 are analogous to FIGS. 21-26, except that closed loop 12 is now perpendicular to rounded clip arms 36 and 38. FIG. 27 is a side view with the clip arms closed. FIG. 28 is an end view corresponding to FIG. 27. Now FIG. 29 is a side view with clip arms 36 and 38 open, and FIG. 30 is a top view showing closed loop 12 perpendicular to rounded upper clip arm 36. FIG. 31 is a pictorial view corresponding to the side view of FIG. 29, and FIG. 32 is like FIG. 31, with ornament 28 added.

Figure 33:
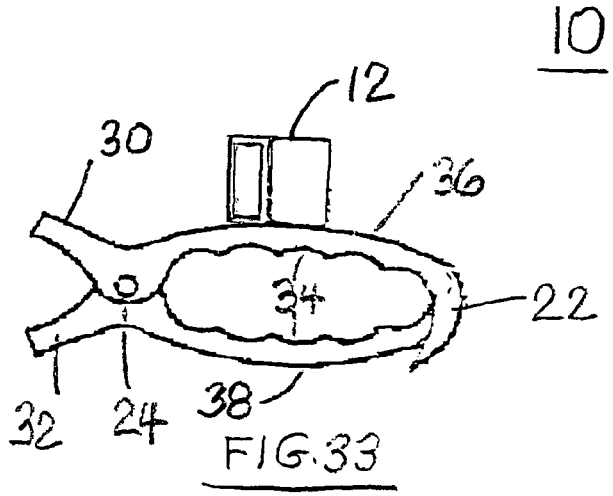
Figure 34:
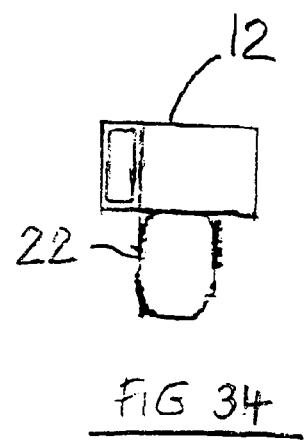
Figure 35:
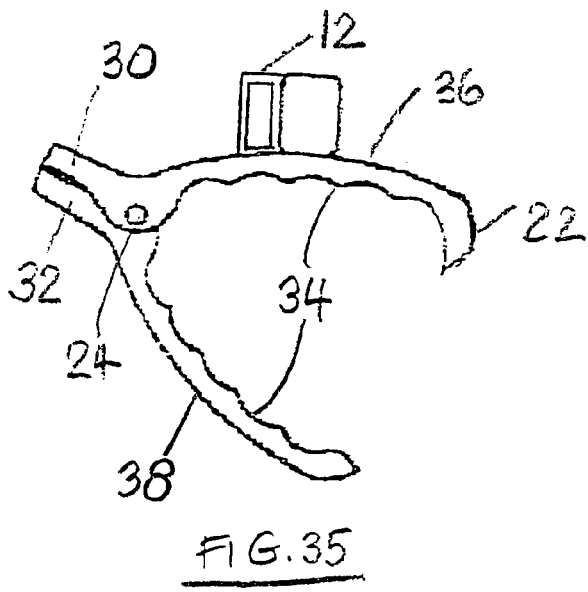
Figure 36:
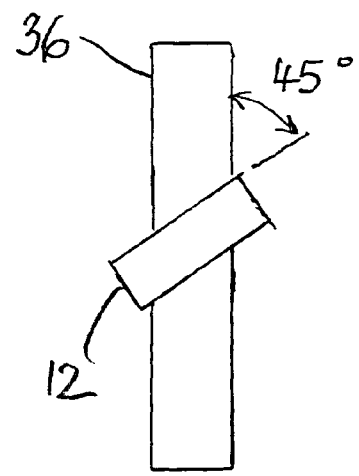

FIGS. 33-38 are analogous to FIGS. 21-26 (parallel closed loop) and FIG. 27-32 (perpendicular closed loop), except that closed loop 12 is now at 45 degrees to rounded clip arms 36 and 38. FIG. 33 is a side view with rounded clip arms 36 and 38 closed. FIG. 34 is an end view corresponding to the side view of FIG. 33. Now FIG. 35 is a side view with clip arms 36 and 38 open, and FIG. 36 is a top view showing the 45 degree angle made by closed loop 12. FIG. 37 is a pictorial view corresponding to side view of FIG. 35, with clip arms 36 and 38 open. FIG. 38 is like FIG. 37 except that ornament 28 is added.

Figure 39:
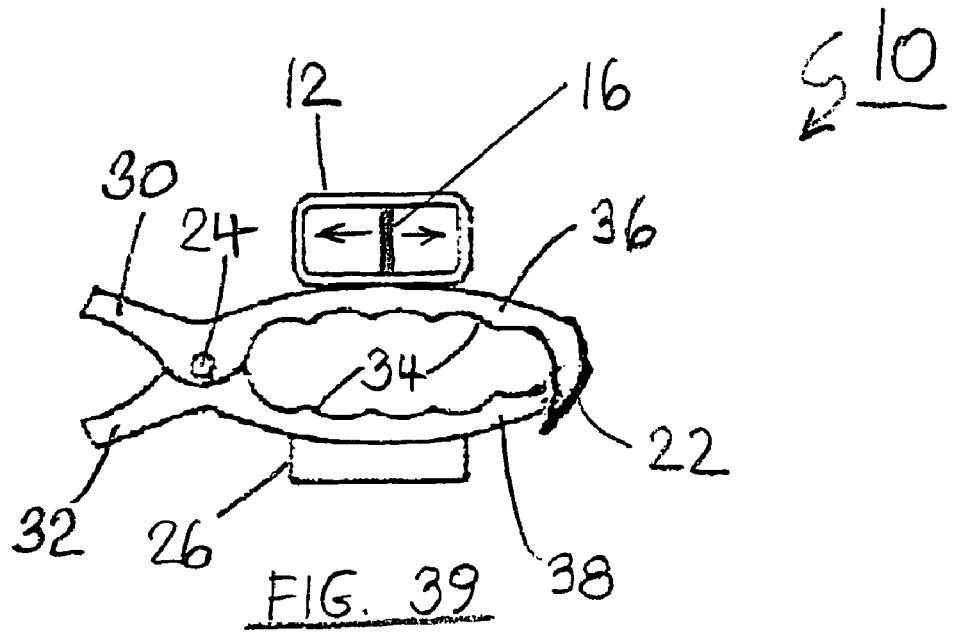
Figure 40:
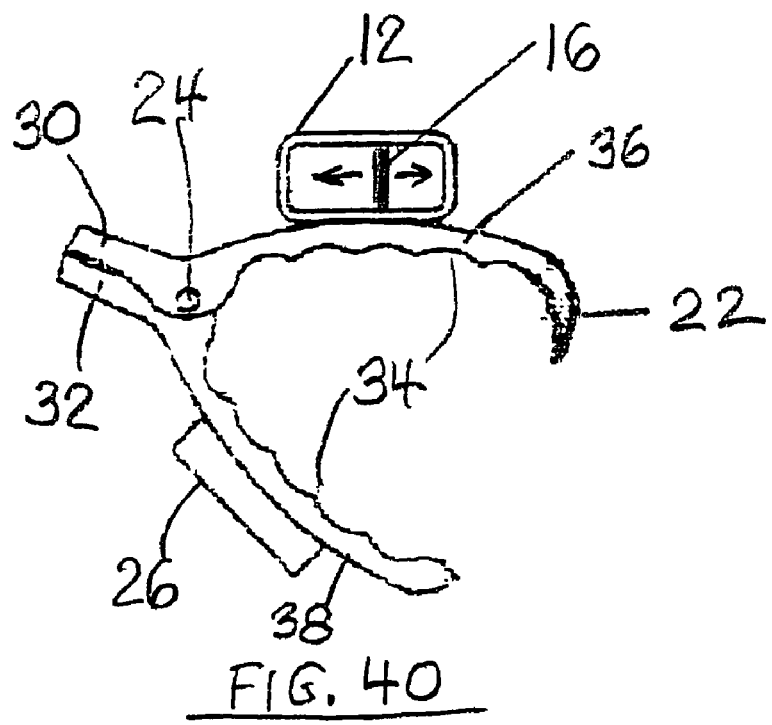

A movable slider partition 16 inside closed loop 12 is shown in FIG. 39 which is otherwise the same as FIG. 21, and in FIG. 40 which is otherwise the same as FIG. 23.

FIGS. 41-44 show the comb shape clip arm design, with open loop 14 parallel to upper comb clip arm 40 and lower comb clip arm 44. Also shown are spring hinge 24, top lever 30, and bottom lever 32. FIG. 41 is a side view with clip arms 40 and 44 closed. FIG. 42 is the end view corresponding to FIG. 41 and FIG. 43 is a pictorial view corresponding to the side view of FIG. 41. Now FIG. 44 is the same as FIG. 43, with ornament 28 added, affixed to upper comb clip arm 40.

Figure 47:
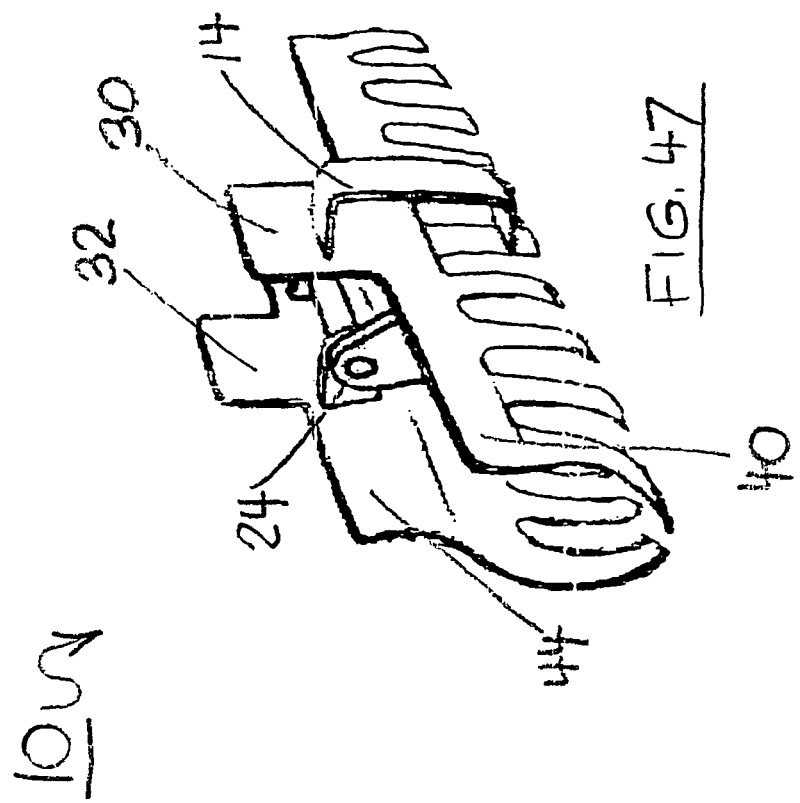
Figure 45:
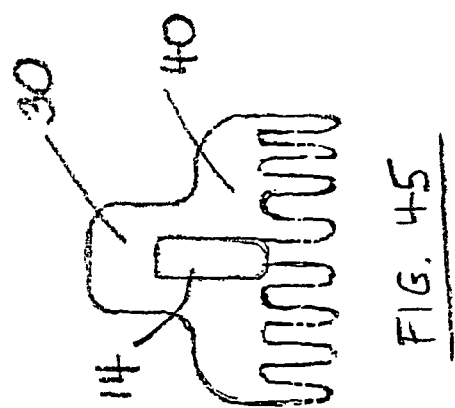
Figure 46:
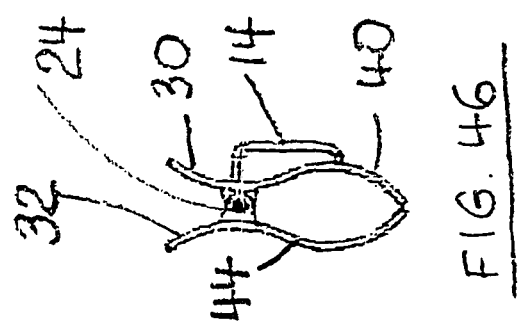

FIGS. 45-47 show open loop 14 perpendicular to comb clip arms 40 and 44.

FIG. 45 is a side view with clip arms 40 and 44 closed. FIG. 46 is an end view corresponding to FIG. 45, and FIG. 47 is a pictorial view corresponding to the side view of FIG. 45.

Figure 48:
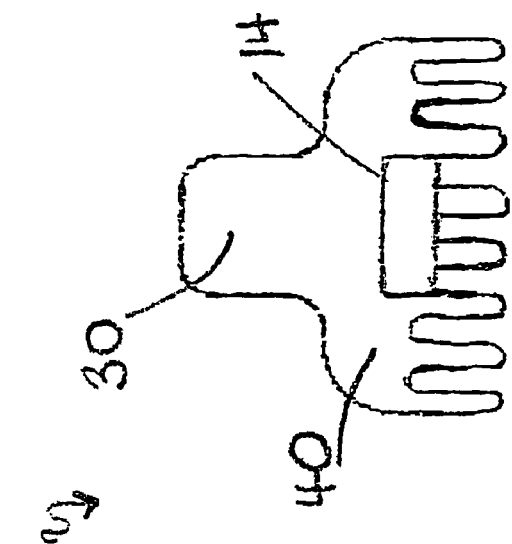
Figure 49:
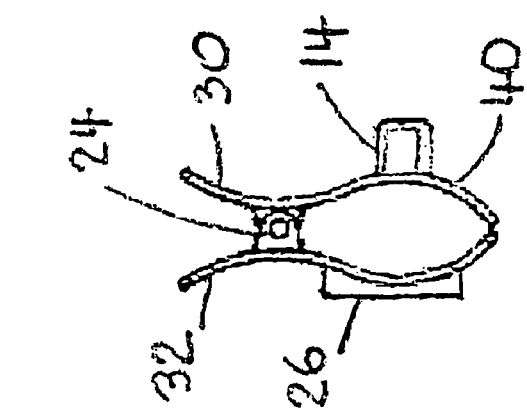

FIGS. 48-49 show magnet 26 added to FIGS. 41-42 which show open loop 14 parallel to comb clip arms 40 and 44.

Figure 50:
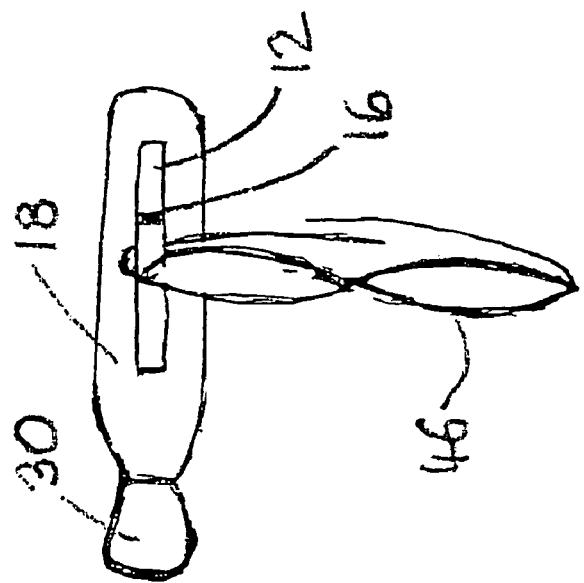

FIG. 50 shows eyeglasses 46 carried in a closed loop 12, with slider partition 16, affixed parallel to straight upper clip arm 18.

Figure 51:
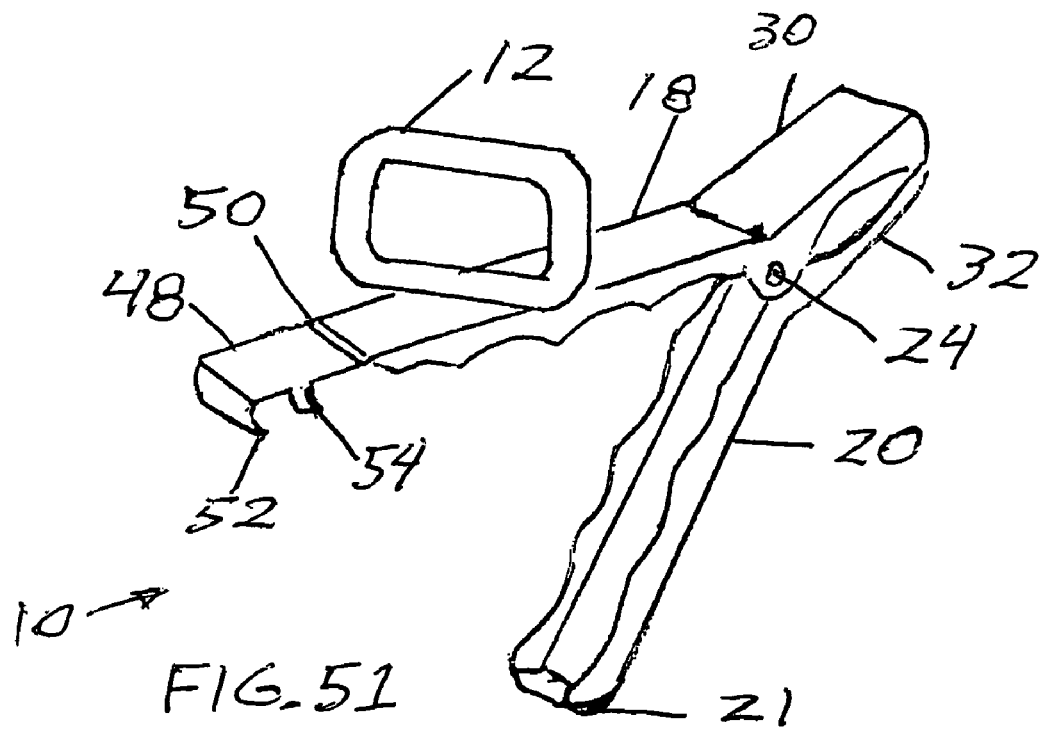
Figure 52:
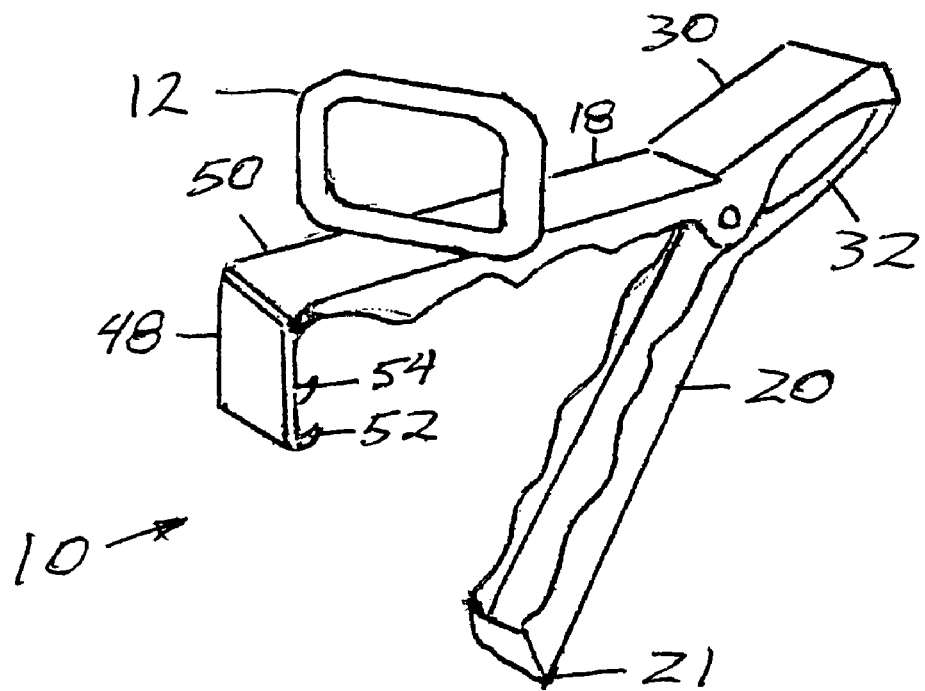

FIGS. 51-52 shows perspective views of eyeglass holder 10 with hinged clasp 48.

Figure 53:
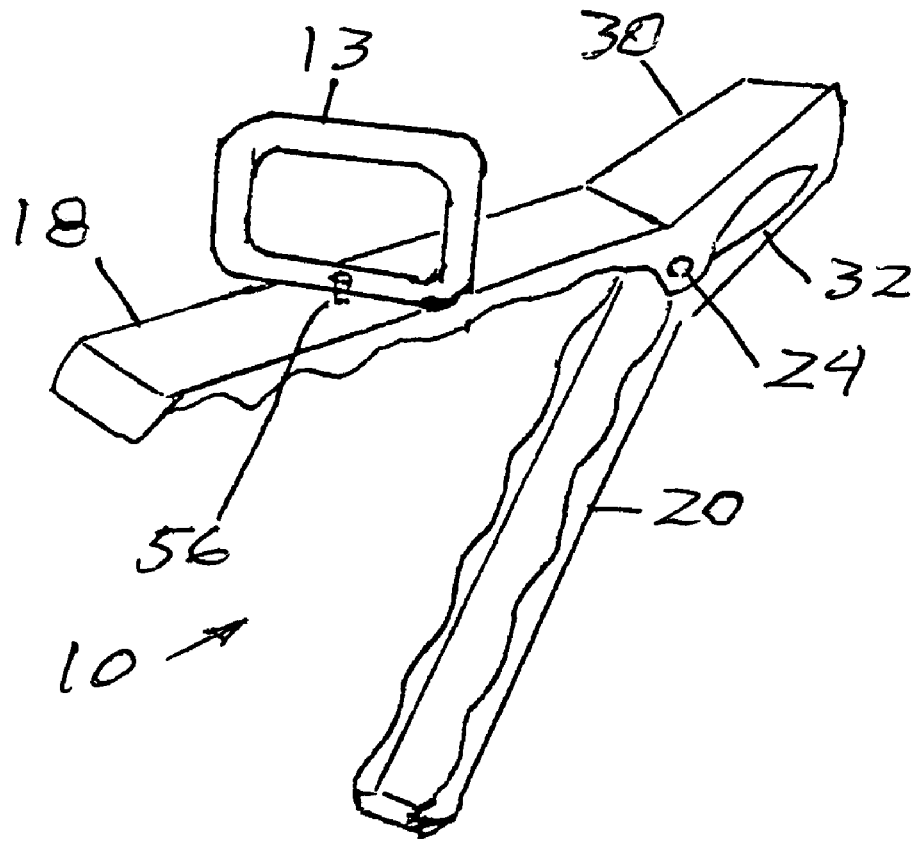

FIG. 53 shows a perspective view of eyeglass holder 10 with loop 13 attached at pivot 56.

FIG. 54 shows an enlarged view of loop 13 attached to a pivot.

Operation of Invention

For all designs—Straight, Rounded and Comb shape—the procedure is the same: press together top lever 30 and bottom lever 32, which will separate upper clip arm (18, 36, 40) from lower clip arm (20, 38, 44). Still keeping levers 30 and 32 depressed, place the clip arm aperture around the desired attach object. When in place, release the levers (30,32), allowing the clip arms (18-20, 36-38, 40-44) to close on or around the desired object and so attach the eyeglass holder.

Now the free end of an eyeglass temple piece is inserted from above into closed loop 12 or open loop 14 all the way until the other end of the temple piece is adjacent to loop 12 or 14, with the rest of the eyeglasses connected to it.

If a movable slider partition 16 is provided, this can be slid inside closed loop 12 toward the inserted temple piece to secure it in place. The weight of the eyeglasses now keeps them secure in the eyeglass holder of the invention.

If the eyeglasses are to be attached to a plane ferrous metallic surface, a magnet 26 (as shown in FIGS. 21-26, 39-40 and 48-49) can be provided for a magnetic attachment of the eyeglass holder in place of the attachment by clip arms. Similarly, adhesive strip 42 (in place of magnet 26) can secure the eyeglass holder to a surface which can accept adhesive strips.

To extract the eyeglasses from the holder, slider 16 (if provided) is slid away from the temple piece in loop 12, and then the temple piece and connected eyeglasses are lifted out of loop 12. Later the eyeglass holder may be removed from its attach object by depressing levers 30 and 32 to open the clip 20 arm aperture, or by detaching magnet 26, or by peeling off adhesive strip 42, depending on the attach method used.

The designs of the invention provide an eyeglass holder with secure attachment (and subsequent detachment) means to a variety of attach objects. The advantages include portability, ease of use and an attractive appearance.

In many of the drawings in FIGS. 21-40, closing clasp 22 is shown at the distal end of upper clip arm 36. Closing clasp 22 is curved or hooked at its end and is part of these eyeglass holder designs for the purpose of helping to keep a holder secured to a belt, strap or other object. For example, when a person is about to attach holder 10 shown in FIG. 21 to an object, such as a belt or strap, the person presses on top lever 30 and bottom lever 32, against a force generated by spring hinge 24. After the person has placed the holder on an object, a force generated by spring hinge 24 presses the upper clip arm 36 and the lower clip arm 38 against the object in the middle of holder 10. As shown in FIG. 21, for example, clip arms 36 and 38 are curved and can accommodate objects of various thicknesses. A belt or strap inserted into holder 10 of FIG. 21, for example, could be so thick as to cause the distal ends of the arms 36 and 38 to be separated, but not to the extent shown in FIG. 23. The closing clasp 22 could in many such situations cover over the lower distal end, which would help to keep holder 10 on such an object. If the hook or curved portion of closing clasp 22 covers or overlaps with the distal end of lower arm 38, then holder 10 is less likely to be pushed or knocked off of the object it is clamped onto.

FIGS. 51-52 shows eyeglass holder 10 in an open position in a perspective view. The distal end 19 of upper clip arm 18 includes hinged closing clasp 48 attached to arm 18 by hinge 50. Hinge 50 can be a friction type of hinge, where the clasp 48 does not change position without a user moving clasp 48 to change its angle with respect to arm 18. The angle of clasp 48 with respect to arm 18 can vary from about 0 degrees, as shown in FIG. 51 to about 90 degrees as shown in FIG. 52. Clasp 48 on its interior surface includes hooks 52 and 54. Hinged clasp 48 is shown in an open position in FIG. 51, rotated away from lower clip arm 20. FIG. 52 shows the eyeglass holder of FIG. 51, except that hinged clasp 48 has been rotated down toward lower clip arm 20.

One method of using the holder of FIGS. 51-52 is to press on lever arms 30 and 32 to open holder 10 and separate the distal ends 19 and 21 of respective arms 18 and 20 from each other. In one mode of operation, clasp 48 can remain at a 0 degree angle with respect to arm 18 until holder 10 is positioned over an object, such as a strap or belt and then clasp 48 is bent down and positioned over the distal end 21 of arm 20, thus securing holder 10 from accidentally opening and falling off of an object. If holder 10 is dislodged off an object while holding a pair of eyeglasses, then the eyeglasses could be damaged.

FIGS. 51 and 52 also show the inner surface of clasp 48 with hooks 52 and 54. Hooks 52 and 54 shown are examples, at least one such hook could be part of clasp 48, and as many hooks as may be needed for a particular design could be used. Hooks 52 and 54 can function to help secure distal end 21 of lower arm 20. Hooks 52 and 54 can also take the form of ribs without hooks, and form multiple channels or grooves between the ribs, and one of the channels can be selected to receive distal end 21.

In another embodiment of the present invention, hinge 50 is a spring hinge, with the force of the hinge causing clasp 48 to rotate down and towards distal end 21 of lower arm 20 as shown in FIG. 52. With such a spring hinge, a person would have to rotate clasp 48 away from lower arm 20, press levers 30 and 32 to open holder 10, place holder 10 on an object, release the holder to grasp the object and then position clasp 48 over distal end 21 of lower arm 20.

FIG. 53 shows eyeglass holder 10 with loop 13 attached at pivot 56, enabling loop 13 to be rotated into a position selected by a user. Being able to maintain loop 13 in the horizontal plane, while upper and lower clip arms 18 and 20 could be at an angle that is the most suitable for attaching to an object makes such a holder 10 easier to use. A simple pivot could be made of any of a variety of fasteners, such as rivets.

FIG. 54 shows an expanded view, not to scale, of an alternate type of pivot assembly for eyeglass holder 10. Loop 13 is attached to upper arm 18 by pivot pin 58 and spring 60. Spring 60 provides a force to pull loop 13 towards arm 18. To change the angle of loop 13 with respect to arm 18, loop 13 can be pulled away from arm 18 by a fraction of an inch and then loop 13 can be turned and loop 13 retracts closer to arm 18.

It is to be understood that the invention may be realized with embodiments differing from the specific devices disclosed herein without departing from the scope of the present invention as delineated in the following claims.

I claim:

1. An eyeglass holder for holding a pair of eyeglasses, the eyeglass holder being attachable to external objects and comprising:
    an upper clip arm having a closing clasp at a distal end of the upper clip arm;
    a top lever joined to the upper clip arm at a junction point, together forming an upper crank;
    a lower clip arm;
    a bottom lever joined to the lower clip arm at a junction point, together forming a lower crank;
    a spring hinge bringing together the upper crank and the lower crank coaxially at the junction points, with a spring force keeping the upper clip arm and the lower clip arm closed against each other; and
    a loop attached to the upper clip arm for holding a temple piece of the pair of eye glasses;
    wherein by pressing together the top lever and the bottom lever the spring force is counteracted to form a clip arm aperture for subsequent closing on or around the external object to attach the eyeglass holder with the pair of eyeglasses to the external object; and
    wherein the closing clasp comprises a hinged closing clasp, the distal end of the closing clasp can be hingedly positioned to either receive or to release the distal end of the lower clip arm.

2. The eyeglass holder of claim 1, wherein the distal end of the closing clasp comprises at least one hook or groove, the at least one hook or groove can be positioned to receive the distal end of the lower clip arm.

3. The eyeglass holder of claim 1, wherein the hinged closing clasp comprises a spring loaded hinge, the force of the spring loaded hinge bringing the distal end of the closing clasp substantially proximate to the distal end of the lower clip arm.

4. The eyeglass holder of claim 3, wherein the distal end of the closing clasp comprises at least one hook, the at least one hook can be positioned to receive the distal end of the lower clip arm.

5. The eyeglass holder of claim 1, and further comprising a movable slider partition within the loop.

6. The eyeglass holder of claim 1, wherein the loop is either parallel, perpendicular or at a 45 angle with respect to the upper clip arm.

7. The eyeglass holder of claim 1, and further comprising at least one of: an ornament, a magnet or an adhesive strip.

8. The eyeglass holder of claim 1, wherein the upper clip arm and the lower clip arm are straight with interior gripping surfaces.

9. The eyeglass holder of claim 1, wherein the upper clip arm and the lower clip arm are rounded with internal gripping surfaces.

10. The eyeglass holder of claim 1, wherein the upper clip arm and the lower clip arm have a comb shape.

11. An eyeglass holder for holding a pair of eyeglasses, the eyeglass holder being attachable to external objects and comprising:
    an upper clip arm having a closing clasp at a distal end of the upper clip arm;
    a top lever joined to the upper clip arm at a junction point, together forming an upper crank;
    a lower clip arm; a bottom lever joined to the lower clip arm at a junction point, together forming a lower crank;
    a spring hinge bringing together the upper crank and the lower crank coaxially at the junction points, with a spring force keeping the upper clip arm and the lower clip arm closed against each other;
    a loop attached to the upper clip arm for holding a temple piece of the pair of eye glasses; and
    a spring and pivot pin for pivotally attaching the loop to the upper clip arm, wherein the loop can be rotated about the pivot pin with respect to the upper clip arm;
    wherein by pressing together the top lever and the bottom lever the spring force is counteracted to form a clip arm aperture for subsequent closing on or around the external object to attach the eyeglass holder with the pair of eyeglasses to the external object.

12. The eyeglass holder of claim 11, and further comprising a movable slider partition within the loop.

13. The eyeglass holder of claim 11, wherein the loop is either parallel, perpendicular or at a 45 angle with respect to the upper clip arm.

14. The eyeglass holder of claim 11, and further comprising at least one of: an ornament, a magnet or an adhesive strip.

15. The eyeglass holder of claim 11, wherein the upper clip arm and the lower clip arm are straight with interior gripping surfaces.

16. The eyeglass holder of claim 11, wherein the upper clip arm and the lower clip arm are rounded with internal gripping surfaces.

17. The eyeglass holder of claim 11, wherein the upper clip arm and the lower clip arm have a comb shape.

* * * * *